United States Patent Office 3,346,275
Patented Oct. 10, 1967

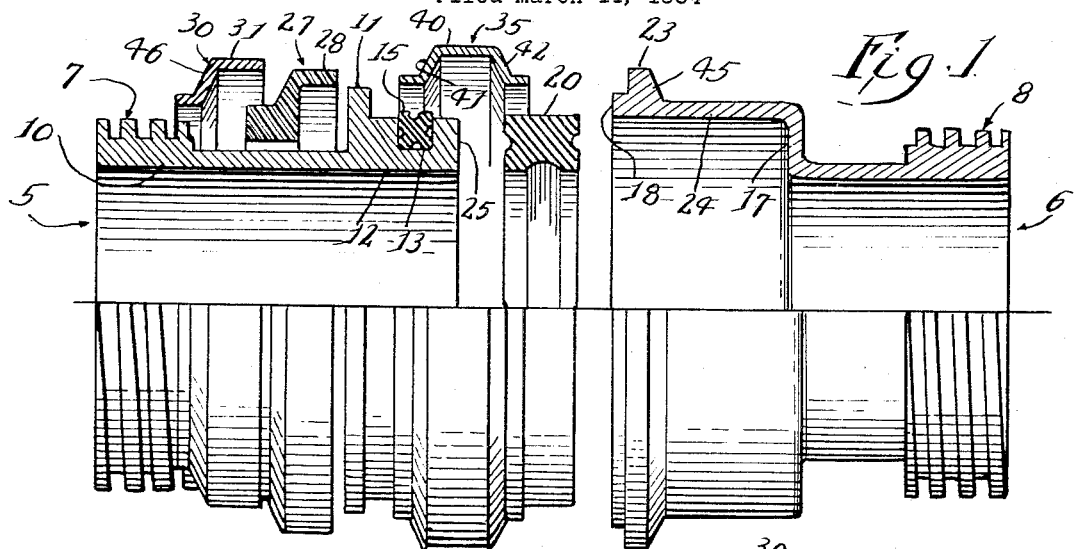
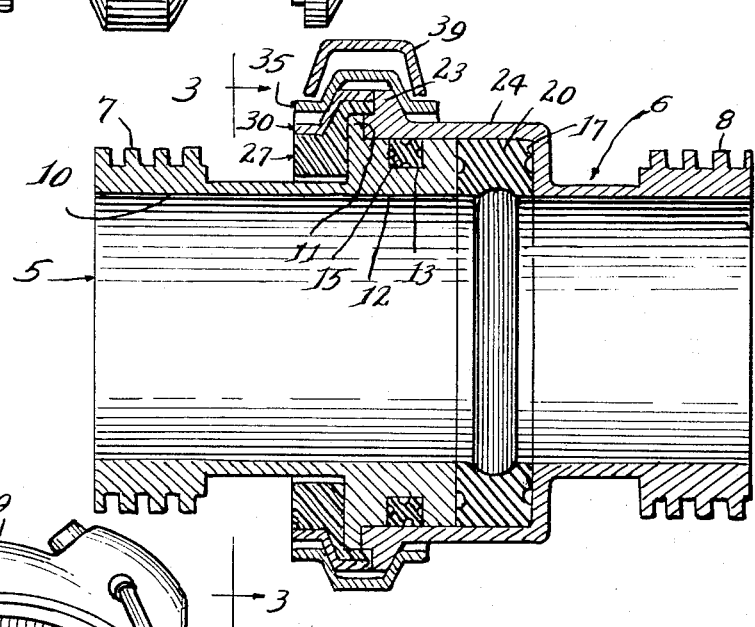
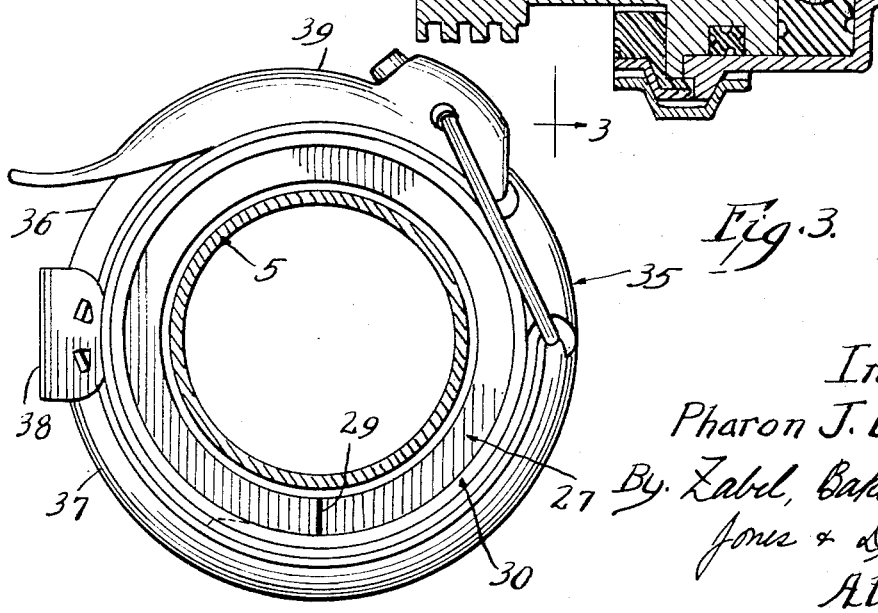

3,346,275
SWIVEL PIPE JOINT
Pharon J. Des Jardins, Kenosha, Wis., assignor to Fitting Specialties Corp., Zion, Ill., a corporation of Illinois
Filed Mar. 11, 1964, Ser. No. 351,070
7 Claims. (Cl. 285—98)

This invention relates to a swivel pipe joint, and more particularly to a detachable swivel pipe joint of the sanitary type.

Swivel pipe joints of sanitary character are used extensively in the food and chemical industries. Such joints are so designed that they may be uncoupled or disassembled quickly and easily for cleaning or other purposes, and coupled or assembled quickly and easily by unskilled personnel. Such joints also must be able to swivel or rotate with low torque through a reasonable angle, preferably 360 degrees, and be leak proof in any angular position, or while rotating.

One object of the invention is to provide a swivel pipe joint of the sanitary type that is highly effective and durable in operation and comparatively inexpensive to manufacture and maintain.

Another object is to provide such a joint wherein one of the two relatively rotatable engaging members of main pairs of such members is metallic and the other is made of rubber, plastic, or the like. This feature minimizes the wear and galling incident to the use of metal bearing members that have relative rotation in use.

Still another object is to provide a swivel pipe joint capable of low torque rotation throughout 360 degrees.

Another object is to provide such a joint wherein only one member necessarily is removed when the joint is uncoupled. This is an exterior clamp member that is not in contact with the fluid flowing through the joint.

Another object is to provide such a joint wherein only one interior member, namely a sealing ring, necessarily needs to be removed from the joint in a cleaning operation. Other members may be removed for cleaning on occasion, but such members easily are removed and replaced.

Other objects, advantages and details of the invention will be apparent as the description proceeds, reference being had to the accompanying drawing wherein one form of the invention is shown. It will be understood that the description and drawing are illustrative only, and that the scope of the invention is to be measured by the appended claims.

In the drawing:

FIG. 1 is an expanded elevational view, partly in longitudinal section, of a swivel pipe joint embodying the invention.

FIG. 2 is a longitudinal sectional view of the joint showing the parts in assembled relation.

FIG. 3 is a sectional view on line 3—3 of FIG. 2.

Referring to the drawing, the illustrated swivel pipe joint includes as its two main members a male ferrule 5 and a female ferrule 6. Parts of the two ferrules 5 and 6 telescope one another and will hereafter be referred to as the forward portions or ends.

Opposite or rearward end 7 of male ferrule 5 and rearward end 8 of female ferrule 6 are adapted for more or less permanent attachment to the pipes that are detachably coupled by the present joint. The coupling structure at rearward ends 7 and 8 forms no part of the invention and hence will not be described.

Male ferrule 5 has a smooth cylindrical interior 10 of the diameter that characterizes the joint. It also has an external annular flange 11 spaced rearwardly from the forward end.

In the illustrated form of the invention, male ferrule 5 has a forward portion 12 of increased outer diameter, this portion 12 having an external annular recess 13 between its ends. The external annular flange 11 projects radially outward from the rearward end of forward portion 12.

As illustrated, a sealing ring 15 is seated in annular recess 13, the ring projecting above the cylindrical surface of forward portion 12 to establish a seal with a cooperating member, next described.

Female ferrule 6 has an interior annular shoulder 17 spaced from forward ferrule end 18. The inner diameter of shoulder 17 corresponds to the characteristic inner diameter of the joint.

A sealing ring 20 of resilient material such as rubber is seated against shoulder 17 (FIG. 2). The inner diameter of ring 20 likewise corresponds generally to the characteristic diameter of the joint. When the members of the joint are assembled, the inner surfaces of male ferrule 5, rearward portion of female ferrule 6 and sealing ring 20 are in general alignment, presenting a smooth surface to the flow of fluid through the joint.

An exterior annular flange 23 is provided on female ferrule 6 adjacent forward ferrule end 18. In the illustrated form of the invention, forward portion 24 of female ferrule 6 has increased outer and inner diameters, the latter cooperating to define shoulder 17. Flange 23 extends radially outward from the exterior surface of forward portion 24.

The members or parts of the joint previously described are assembled as shown in FIG. 2 when the joint is coupled. Sealing ring 20 is seated on shoulder 17, and male ferrule 5 is telescoped within female ferrule 6, the forward end 25 of male ferrule 5 engaging and exerting pressure on the surface of sealing ring 20 opposite that engaged by shoulder 17. Forward end 18 of female ferrule 6 is adjacent external flange 11 of male ferrule 5.

A collar 27 of low friction material surrounds male ferrule 5 and embraces external flange 11 thereof. It has an axial flange 28 that overlies external flange 11 and extends into bearing engagement with the forward radial portion of the external flange 23 of female ferrule 6. Collar 27 preferably is made of durable plastic material, for example, material sold under the trademark Teflon. The assembled position of collar 27 is shown in FIG. 2, a slit 29 (FIG. 3) being provided in the collar for assembly purposes.

The illustrated form of the invention utilizes a collar cap 30, preferably of metal, that embraces collar 27. Cap 30 has an axial flange 31 that in assembled position overlies and is substantially coextensive with axial flange 28 of collar 27.

The final member of the present swivel pipe joint is a detachable clamp means 35 that embraces collar cap 30 or collar 27 on male ferrule 5 and exterior flange 23 of female ferrule 6. Clamp means 35 (FIG. 3) preferably is somewhat conventional in character, comprising two semi-circular parts 36 and 37 that are hinged by means 38 at a pair of adjacent ends, the other ends provided with a detachable over-center toggle mechanism 39 adapted to draw the ends together in forcible manner.

The semi-circular parts 36 and 37 in longitudinal cross section each comprise a central web 40 (FIG. 1) and radially inwardly directed lateral flanges 41 and 42. As shown in FIG. 2, the web and flanges embrace collar cap 30 on male ferrule 5 and external flange 23 of female ferrule 6 and serve to hold these parts together substantially throughout their circumferences.

Rearward annular surface 45 on external flange 23 of female ferrule 6 and rearward annular surface 46 of collar cap 30 diverge, in the form of the invention shown, in radially inward direction whereby clamp means 35 is able to force the surfaces toward each other with wedging action. Flanges 41 and 42 of semi-circular parts 36 and 37 of clamp means 35, as shown, also diverge in radially inward direction, thereby providing substantial bearing area to cooperate in developing the wedging action.

From the foregoing description it will be seen that the swivel joint of the invention is simple in construction and rugged in character. It easily can be disassembled for cleaning or other purposes, and is subject to ready reassembly.

The joint is rotatable through 360 degrees, and, aside from the engagement provided by the sealing ring or rings, the main bearing relation between the male and female parts is the engagement between collar 27 of low friction material on male ferrule 5 and metallic external flange 23 of female ferrule 6. When the joint is swiveled or rotated, male ferrule 5 and its associated sealing ring 15 are the only two parts that have relative rotation with respect to the other parts of the joint.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. A swivel pipe joint comprising:
   a male ferrule having a forward portion of increased outer diameter, said forward portion having an external annular recess and a rearward external annular flange;
   a first resilient sealing ring in said annular recess;
   a female ferrule having a forward portion of increased inner and outer diameters providing an interior annular shoulder, said forward portion having an external annular flange adjacent the forward end;
   a second resilient sealing ring in said female ferrule engaging said shoulder;
   the forward portion of said male ferrule telescoping said forward portion of said female ferrule, the sealing rings of each portion engaging the other portion, said external annular flange of said male ferrule adjacent said forward portion of said female ferrule;
   a collar of low friction material on said male ferrule having an internal radial surface engaging the rearward radial surface of said external annular flange of said male ferrule and an axially extending portion overlying the outer cylindrical portion of said external annular flange of said male ferrule and engaging the forward radial portion of said external annular flange of said female ferrule;
   a collar cap embracing said collar; and
   a detachable over-center annular clamp embracing said collar cap and said annular flange of said female ferrule.

2. A swivel pipe joint comprising:
   a male ferrule having a forward portion having a rearward external annular flange;
   a female ferrule having a forward portion of increased inner and outer diameters providing an interior annular shoulder, said forward portion having an external annular flange adjacent the forward end;
   a resilient sealing ring in said female ferrule engaging said shoulder;
   the forward portion of said male ferrule telescoping said forward portion of said female ferrule and engaging said sealing ring;
   another sealing ring between opposing surfaces of said forward portions;
   a collar of low friction material on said male ferrule having an internal radial surface engaging the rearward radial surface of said external annular flange of said male ferrule and an axially extending portion overlying the outer cylindrical portion of said external annular flange of said male ferrule and engaging the forward radial portion of said external annular flange of said female ferrule;
   a collar cap embracing said collar; and
   detachable clamp means embracing said collar cap and said annular flange of said female ferrule.

3. A swivel pipe joint comprising:
   a male ferrule having an external annular flange spaced from the forward end;
   a female ferrule having an interior annular shoulder spaced from the forward end and an exterior annular flange adjacent the forward end;
   a resilient sealing ring in said female ferrule engaging said shoulder;
   said male ferrule telescoping said female ferrule and engaging said sealing ring;
   another sealing ring between opposing surfaces of said male and female ferrules;
   a collar of low friction material on said male ferrule having an internal radial surface engaging the rearward radial surface of said external annular flange of said male ferrule and an axially extending portion overlying the outer cylindrical portion of said external annular flange of said male ferrule and engaging the forward radial portion of said external annular flange of said female ferrule;
   a collar cap embracing said collar; and
   detachable clamp means embracing said collar cap and said annular flange of said female ferrule.

4. The combination of claim 3 wherein the rearward annular surfaces of said external annular flange on said female ferrule and of said collar cap diverge in radially inward direction whereby said clamp means forces said surfaces toward each other with wedging action.

5. The combination of claim 3 wherein said clamp means has spaced annular flanges that diverge in radially inward direction whereby said flanges force together with wedging action said external annular flange on said female ferrule and said collar cap.

6. A swivel pipe joint comprising:
   a male ferrule having an external annular flange spaced from the forward end;
   a female ferrule having an interior annular shoulder spaced from the forward end and an exterior annular flange adjacent the forward end;
   a resilient sealing ring in said female ferrule engaging said shoulder;
   said male ferrule telescoping said female ferrule and engaging said sealing ring;
   another sealing ring between opposing surfaces of said male and female ferrules;
   a collar of low friction material on said male ferrule having an internal radial surface engaging the rearward radial surface of said external annular flange of said male ferrule and an axially extending portion overlying the outer cylindrical portion of said external annular flange of said male ferrule and engaging the forward radial portion of said external annular flange of said female ferrule; and
   detachable clamp means embracing said collar and said annular flange of said female ferrule.

7. A swivel pipe joint comprising:
   a male ferrule having an external annular flange spaced from the forward end;
   a female ferrule having an interior annular shoulder spaced from the forward end and an exterior annular flange adjacent the forward end;

a resilient sealing ring in said female ferrule engaging said shoulder;
said male ferrule telescoping said female ferrule and engaging said sealing ring;
a collar of low friction material on said male ferrule having an internal radial surface engaging the rearward radial surface of said external annular flange of said male ferrule and an axially extending portion overlying the outer cylindrical portion of said external annular flange of said male ferrule and engaging the forward radial portion of said external annular flange of said female ferrule; and
detachable clamp means embracing said collar and said annular flange of said female ferrule.

References Cited

UNITED STATES PATENTS

| 1,930,833 | 10/1933 | Barrett | 285—281 |
| 2,601,172 | 6/1952 | Sebok | 285—367 X |
| 3,042,430 | 7/1962 | Guy | 285—365 |
| 3,201,152 | 8/1965 | Coats | 285—281 X |

FOREIGN PATENTS

| 518,930 | 3/1940 | Great Britain. |
| 540,375 | 10/1941 | Great Britain. |

CARL W. TOMLIN, *Primary Examiner.*

THOMAS F. CALLAGHAN, *Assistant Examiner.*